UNITED STATES PATENT OFFICE.

WALTER BEACALL BISHOP AND ALFRED BISHOP, OF LONDON, ENGLAND.

PROCESS OF MAKING PIPERAZIN SALTS.

SPECIFICATION forming part of Letters Patent No. 597,454, dated January 18, 1898.

Application filed January 4, 1897. Serial No. 617,958. (Specimens.)

*To all whom it may concern:*

Be it known that we, WALTER BEACALL BISHOP and ALFRED BISHOP, subjects of the Queen of Great Britain, residing at 48 Spelman Street, Mile End, New Town, London, England, have invented certain new and useful Improvements in the Manufacture of Piperazin Compounds; and we do hereby declare that the following is a full, clear, and exact description of the invention, which will enable others skilled in the art to which it appertains to make and use the same.

The object of this invention is to produce stable salts from piperazin, which salts are neither hygroscopic nor deliquescent, as it has been found that piperazin salts as usually prepared readily absorb moisture and carbonic-acid gas from the air and cannot be dried even at very low temperatures without loss of piperazin by volatilization.

Now according to this invention we are enabled to form solid compounds of piperazin with citric or tartaric acids, which salts are constant in composition, non-hygroscopic, and non-deliquescent and may be dried at a temperature considerably above the boiling-point of water without melting or loss of piperazin by volatilization. In order to prepare the said salts of citric acid or tartaric acid and piperazin, we dissolve the piperazin or piperazin hydrate in as little boiling water as possible, and when the piperazin or hydrate is thoroughly dissolved we add thereto citric acid or tartaric acid either in the form of powder or as a hot concentrated aqueous solution; or we may mix together suitable proportions of piperazin or piperazin hydrate and citric acid or tartaric acid in the solid state, preferably in the form of powder, and melt the mixture. In either case the resulting product is allowed to crystallize slowly and afterward heated to expel any superfluous moisture.

The proportions of piperazin and citric acid or tartaric acid we have found most suitable are, piperazin, three parts, by weight, and citric acid, two parts, by weight, or piperazin, one part, by weight, and tartaric acid, one part, by weight; or, according to another method of carrying out our invention we add to the hereinbefore-mentioned solution of piperazin or piperazin hydrate in water sufficient citric acid or tartaric acid either in the form of powder or as a concentrated aqueous solution until the resulting compound is neutral in reaction to litmus-paper.

Although the proportions of piperazin and citric acid or tartaric acid hereinbefore stated are those we have found most suitable for ordinary purposes, yet we do not bind ourselves to these exact proportions, as other proportions may be more suitable for special purposes.

Instead of using piperazin or piperazin hydrate and citric or tartaric acids it is obvious that we may use the chemical equivalents of these substances or either of them.

Having fully described our invention, what we claim, and desire to secure by Letters Patent, is—

1. The process of producing stable salts of piperazin which consists in mixing together piperazin and an organic hydroxy acid, melting the mixture allowing it to crystallize slowly and afterward heating the same substantially as hereinbefore specified and for the purpose stated.

2. The process of producing stable salts of piperazin which consists in mixing together piperazin hydrate and an organic hydroxy acid melting the mixture allowing it to crystallize slowly and afterward heating the same substantially as hereinbefore specified and for the purpose stated.

3. The process of producing stable salts of piperazin which consists in dissolving piperazin in a small quantity of water adding thereto a hot aqueous solution of an organic hydroxy acid thoroughly incorporating the same allowing the resulting compound to crystallize slowly and afterward heating the same substantially as hereinbefore specified and for the purpose stated.

4. The process of producing stable salts of piperazin which consists in dissolving piperazin hydrate in a small quantity of water, adding thereto a hot aqueous solution of an organic hydroxy acid thoroughly incorporating the same allowing the resulting compound to crystallize slowly and afterward heating the same substantially as hereinbefore specified.

WALTER BEACALL BISHOP.
ALFRED BISHOP.

Witnesses:
PERCY E. MATTOCKS,
EDMUND S. SNEWIN.